United States Patent
Stasiak et al.

(10) Patent No.: US 6,326,814 B1
(45) Date of Patent: Dec. 4, 2001

(54) METHOD AND APPARATUS FOR ENHANCING NOISE TOLERANCE IN DYNAMIC SILICON-ON-INSULATOR LOGIC GATES

(75) Inventors: Daniel Lawrence Stasiak; Andrew Douglas Davies, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,274

(22) Filed: Mar. 8, 2000

(51) Int. Cl.[7] .............................................. H03K 19/0948
(52) U.S. Cl. ................................ 326/98; 326/121; 326/27
(58) Field of Search .............................. 326/93–98, 119, 326/121, 112, 26–28

(56) References Cited

U.S. PATENT DOCUMENTS

| | | | |
|---|---|---|---|
| 6,052,008 | * 4/2000 | Chu et al. | 326/98 |
| 6,133,759 | * 10/2000 | Beck et al. | 326/121 |
| 6,150,869 | * 11/2000 | Storino et al. | 326/98 |
| 6,163,173 | * 12/2000 | Storino et al. | 326/121 |

* cited by examiner

Primary Examiner—Michael Tokar
Assistant Examiner—Don Phu Le
(74) Attorney, Agent, or Firm—Bracewell & Patterson

(57) ABSTRACT

A method and apparatus for enhancing noise tolerance in dynamic Silicon-On-Insulator (SOI) logic gates improves the performance of dynamic gates using SOI technology. In particular implementations of logic, the logic inputs can be used to enable a pull-up chain constructed from a plurality of transistors. This pull-up chain holds the preset voltage on the summing node of the dynamic logic gate while the logic inputs are in a combination where parasitic bipolar transistors in the input logic chains conduct. The pull-up chain prevents spurious operation of the logic gate due to the conduction of the parasitic bipolar transistors. The pull-up also prevents spurious operation due to charge sharing that occurs when a device in the logic chain is enabled while another device is disabled. The charge sharing occurs due to charging the diffusion capacitance of the device which is disabled.

16 Claims, 4 Drawing Sheets

METHOD AND APPARATUS FOR ENHANCING NOISE TOLERANCE IN DYNAMIC SILICON-ON-INSULATOR LOGIC GATES

BACKGROUND OF THE INVENTION

1. Technical Field

The present invention relates to digital integrated circuits, and more particularly to dynamic logic circuits implemented in Silicon-On-Insulator (SOI) technology with enhancements that improve noise tolerance by reducing bipolar current effects and charge sharing effects within the circuits.

2. Description of the Related Art

Dynamic logic is widely used in integrated circuits, especially Very Large Scale Integrated (VLSI) circuits. Because dynamic logic uses comparably less transistors per gate than static logic, circuit densities are increased, making dynamic logic desirable for use in VLSI circuits such as microprocessors and memories.

Specifically, Complementary Metal Oxide Semiconductor (CMOS) technology has been the technology of choice for low power designs, because the bulk of the power dissipation in these circuits occurs when the transistors are switching. This characteristic has made CMOS implementations preferable for low power static designs, such as microprocessors and other components for use in notebook computers, and recently for desktops in keeping with the trend in "green" desktop computer design. CMOS technology uses P-channel and N-channel MOS devices in a static complementary configuration to form logic gates.

Dynamic gates are not typically complementary designs, as the P-channel devices and the N-channel devices are used to perform different functions in the gate. One transistor type is used to pre-charge an evaluation node, and the complementary type is use to discharge the node in response to logic inputs.

Silicon-On-Insulator (SOI) technology is a relatively new technology having enhanced low power characteristics, which make it ideal for implementing low power dynamic gates. Additionally, parasitic substrate capacitance is decreased, enhancing the switching speed of transistors implemented in SOI. Rather than embedding the channel material in a semiconductor substrate, the channel material is formed on top of an oxide layer, decreasing leakage resistance and parasitic capacitance. Devices are isolated by Shallow Trench Insulation (STI), rather than the substrate, further reducing capacitive effects and noise coupling from other devices.

There is a drawback associated with transistors formed in SOI technology, however. A parasitic bipolar transistor exists in both non-insulated MOS implementations and the SOI implementation. The bipolar transistor has an emitter and collector formed by the doped regions at the two ends of the channel (N+ material for an N-channel MOS transistor). The base of the transistor is formed by the substrate. In non-insulated MOS technology, the substrate is typically biased so that the transistor will always be off. For N-channel material, this bias is accomplished by connecting the substrate to the lowest negative potential in the circuit. In SOI implementations, because the channel material is deposited on an insulator, the base of the parasitic bipolar transistor (formed by the body of the MOS transistor) has no electrical connection. Therefore, when the doped material at the ends of the channel change voltage, the parasitic transistor may turn on until its base capacitance is charged. The conduction is produced by the forward bias of the emitter or collector (formed by the end of the channel) to the base (formed by the un-doped region in the middle of the channel). This is known as the "bipolar effect", and can cause malfunction of dynamic gates implemented in SOI technology. The bipolar effect can cause glitches that discharge the evaluation node when the input state of a transistor coupled to that node changes in such a way that the parasitic bipolar transistor conducts momentarily.

Charge sharing is a problem common to both non-insulated MOS implementations and SOI implementations. When two or more transistors are connected in a chain so that both must conduct to discharge the summing node of a dynamic logic gate, if a device farther away from the summing node is in a non-conducting state and a device closer to the summing node is enabled, the preset voltage on the summing node can be dissipated due to charging the diffusion capacitance of the farther device.

The bipolar effect and the charge sharing effect decrease the noise immunity of a dynamic logic gate, as well as increasing the sensitivity to coupling from other input signals and sub-threshold variations in voltages at the gate's logic inputs.

It would therefore be desirable to implement dynamic logic circuits in such a way that the bipolar effect and charge sharing effect can be reduced or eliminated.

SUMMARY OF THE INVENTION

The objective of enhancing noise immunity in Silicon-On-Insulator (SOI) dynamic logic gates is accomplished in a dynamic logic gate that includes a pre-charge transistor, one or more logic ladders having multiple logic inputs and a pull-up ladder for holding a summing node at a pre-charge state. The pull-up ladder has multiple transistors and the gates of the transistors are each coupled to a unique logic input. The logic ladder and pull-up ladder are both coupled to the summing node of the logic gate.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF PREFERRED EMBODIMENT

Figure 1A:
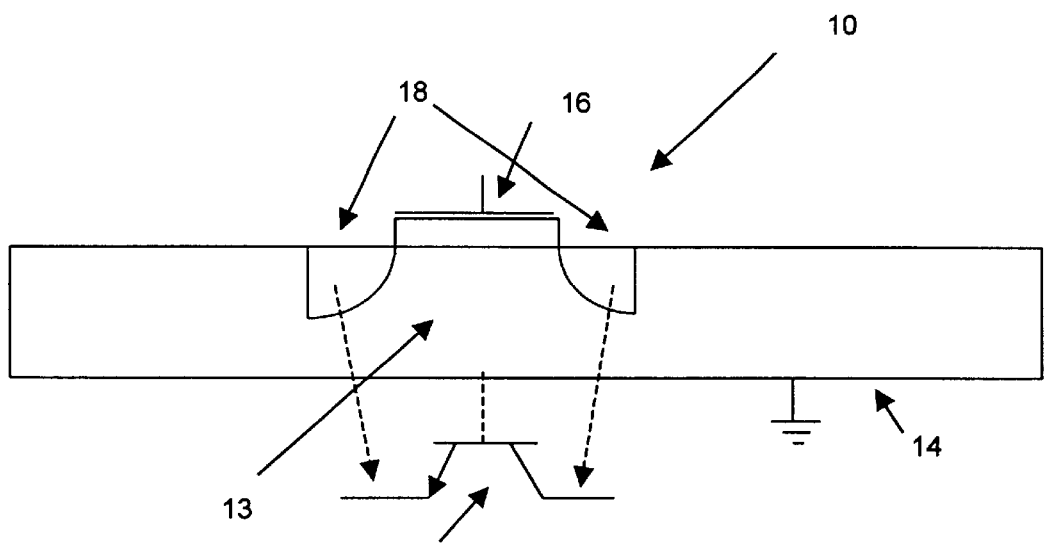
FIG. 1A is a pictorial diagram depicting the structure of a MOS transistor formed on a semiconductor substrate.

With reference now to the figures and in particular with reference to FIG. 1A, there is depicted a Metal Oxide Semiconductor (MOS) transistor 10 on a semiconductor substrate 14. The doped regions 18 provide conduction barriers when the potential on a gate 16 is such that no field is developed in a channel 13. Substrate 14 is connected to the point of lowest potential in the circuit (in this case ground). This substrate connection serves as a bias to prevent conduction of a parasitic bipolar transistor 12 that is formed by doped regions 18 and a substrate 13.

Figure 1B:
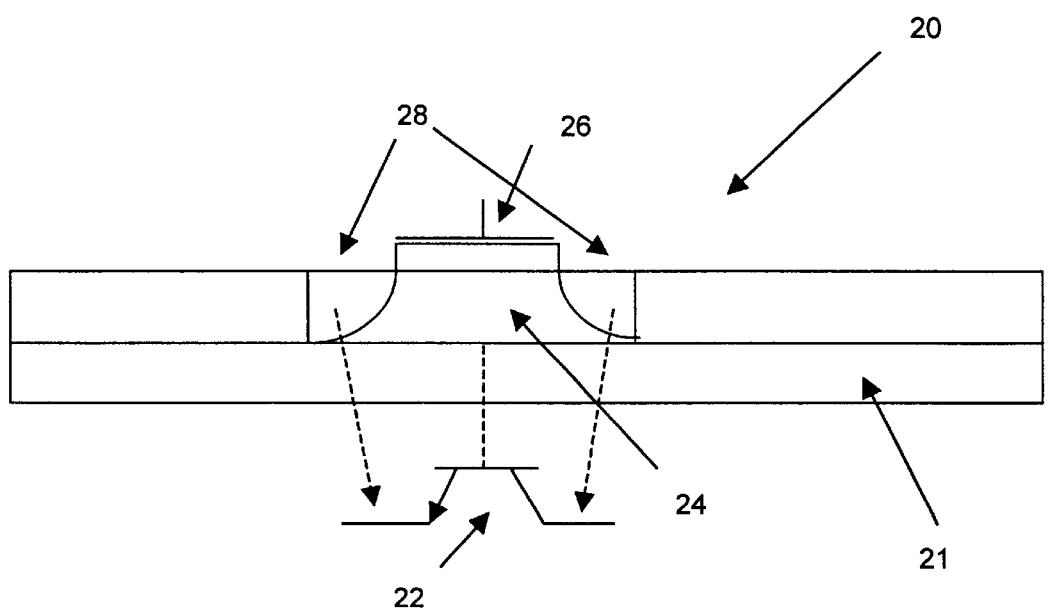
FIG. 1B is a pictorial diagram depicting the structure of a MOS transistor formed on an insulating substrate.

Referring now to FIG. 1B, there is depicted a MOS transistor 20, formed on an insulating substrate 21. Within MOS transistor 20, a parasitic bipolar transistor 22 is formed by a channel 24 and doped regions 28. Since there is no bias connection to channel 24, the base of parasitic bipolar transistor 22 is effectively floating. If any of the doped regions 28 that form the source and drain connections to MOS transistor 20 are pulled low, the emitter-base or collector-base junction of parasitic bipolar transistor 22 will conduct momentarily, causing current to flow from the opposite doped region 28.

Figure 2:
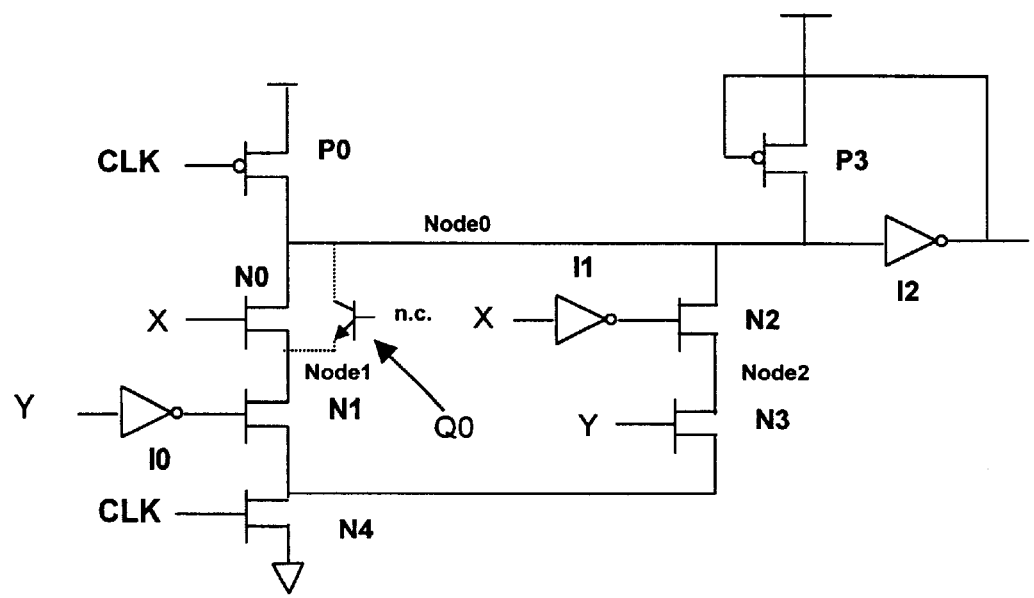
FIG. 2 is a schematic diagram of a prior art half sum circuit.

Referring now to FIG. 2 a prior art half-sum circuit is depicted. Logic inputs X and Y are supplied to a first logic input ladder formed by transistors N0 and N1, and a second logic input ladder formed by transistors N2 and N3, respectively. The inversion of input Y by inverter I0 and input X by I1 provide an exclusive-NOR (XNOR) logic function at Node0, in that one of the two logic input chains will conduct if inputs X and Y are in different logic states. Inverter I2 converts the XNOR result at Node0 to an XOR result. Half-latch device P3 holds Node0 in a logic high state after it is preset by pre-charge transistor P0 when CLK is set to a logic low state. Node0 will be held in the logic high state until one of the logic input ladders conducts. Foot device N4 provides that the logic input ladders will not conduct when CLK is in the logic low state. This would prevent Node0 from being pre-charged, and cause excessive current to be drawn during the pre-charge phase.

In this circuit, when logic input Y is switched from a logic high to a logic low while logic input X is in a logic low state and Node1 is charged, parasitic bipolar transistor Q0 will conduct momentarily, causing current to be drawn from Node0. Due to this conduction and further aggravating the problem if noise occurs at input X simultaneously, Node0 could evaluate to an erroneous logic low state, causing improper operation of the logic gate. Similarly, when logic input Y is in a logic low state and logic input X transitions from a logic high state to a logic low state, device N2 will turn on, causing current to be drawn from Node0 until the potential at Node2 is equal to the potential at Node0. This charge sharing effect can cause the pre-charge voltage at Node0 to be dissipated, just as in the case of the bipolar effect.

Improvements have been made in the dynamic logic circuits to obviate mis-operation of the logic caused by the bipolar effect. The techniques disclosed in co-pending application Ser. No. 09/382,760 "METHOD AND APPARATUS FOR REDUCING BIPOLAR CURRENT EFFECTS IN SILICON-ON-INSULATOR (SOI) DYNAMIC CIRCUITS" could be used, but for the type of circuit depicted in FIG. 2, an alternative solution is preferable. Because inverters I0 and I1 will effectively filter noise at their inputs, it is not necessary to prevent the bipolar effect for all state changes of the logic inputs than can create bipolar effects, but only for those state changes where the transistor exhibiting the bipolar effect is coupled to a noisy circuit, such as a long line from another circuit. Therefore, transistor N2 does not have to be "treated" for the bipolar effect, because its gate is coupled to an inverter located proximally in the circuit. By arranging the logic input ladders so that the bipolar effect occurs when the logic signals occur in a particular combination (in our exemplary embodiments, when both logic signals are in a logic low state), a series-connected transistor chain can be used as a pull-up to prevent the summing node from being erroneously discharged, with the inputs of the transistors in the pull-up chain coupled to the logic inputs of the gate. This represents an improvement over the technique disclosed in the above-referenced patent application, as fewer devices are required for particular types of gates, such as the half-sum circuit.

Figure 3A:
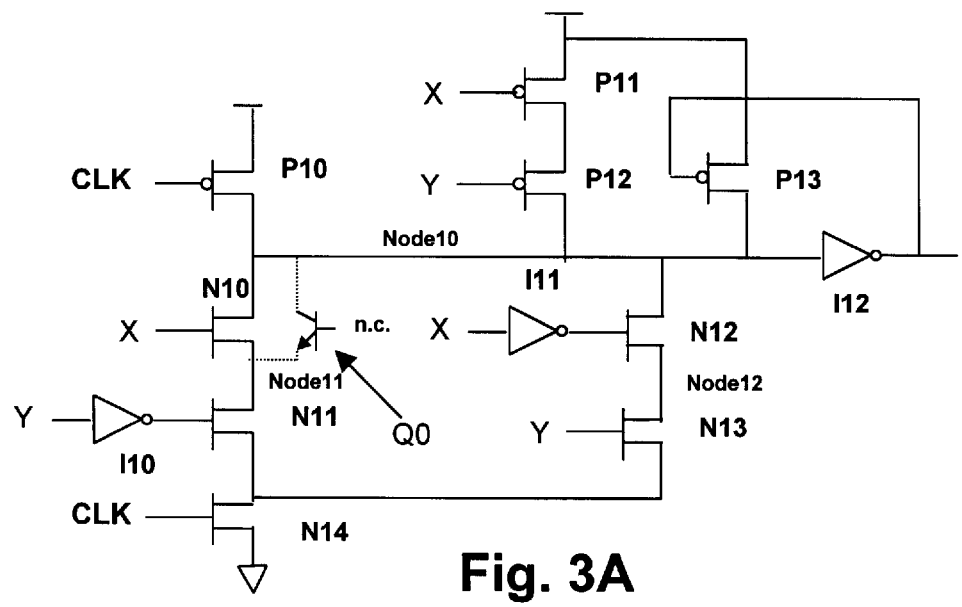
FIG. 3A is a schematic diagram of a half sum circuit in accordance with a preferred embodiment of the invention.

Referring now to FIG. 3A, an improved half-sum circuit is depicted, having increased noise tolerance due to reduction of the bipolar effect and charge sharing effect. Transistors P11 and P12 form a pull-up ladder, wherein the precharge at Node10 will be maintained by the pull-up ladder when logic inputs X and Y are in a logic low state. This pull-up ladder "assists" the half-latch formed by transistor P13 when one of inputs X or Y transitions to a low state while the other is at a logic low state or simultaneously transitions to a low state. When logic input X is low and logic input Y makes a transition to a low state, parasitic bipolar transistor Q0 may momentarily conduct if Node11 is charged. Without the pull-up chain, Node10 might be erroneously pulled low by conduction through the collector of parasitic bipolar transistor Q0. Instead, transistors P11 and P12 supply enough current to prevent the bipolar effect from erroneously discharging Node10. When logic input Y is low and logic input X makes a transition to a low state, the diffusion capacitance of N13 must be charged. Transistors P11 and P12 also supply enough current to prevent this charge-sharing effect from erroneously discharging Node10.

Figure 3B:
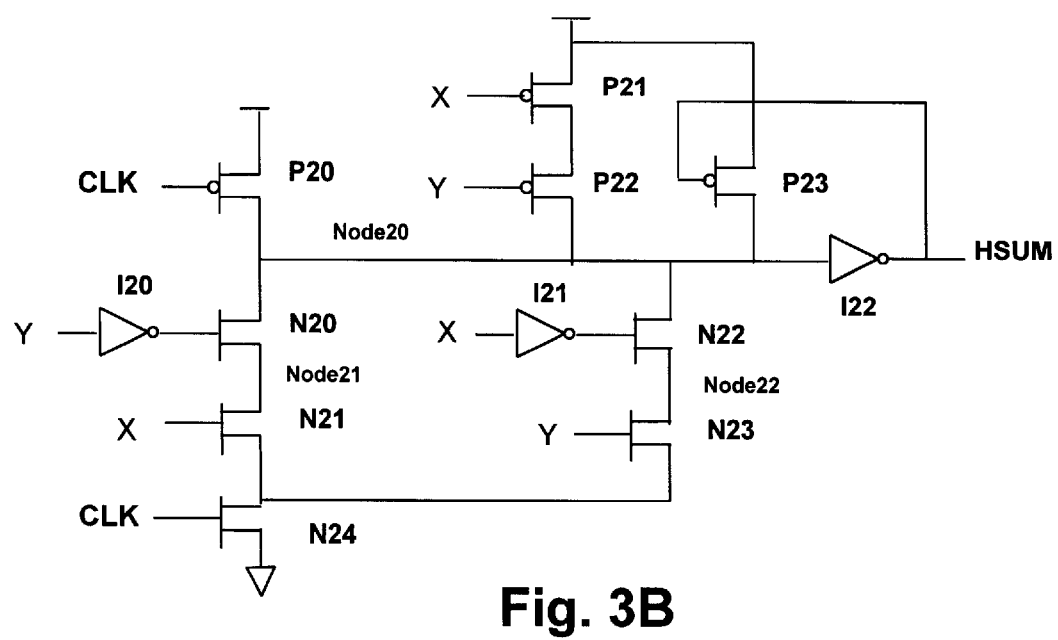
FIGS. 3B, 3C and 3D are schematic diagrams of a half sum adder circuit in accordance with alternative embodiments of the invention.
Figure 3C:
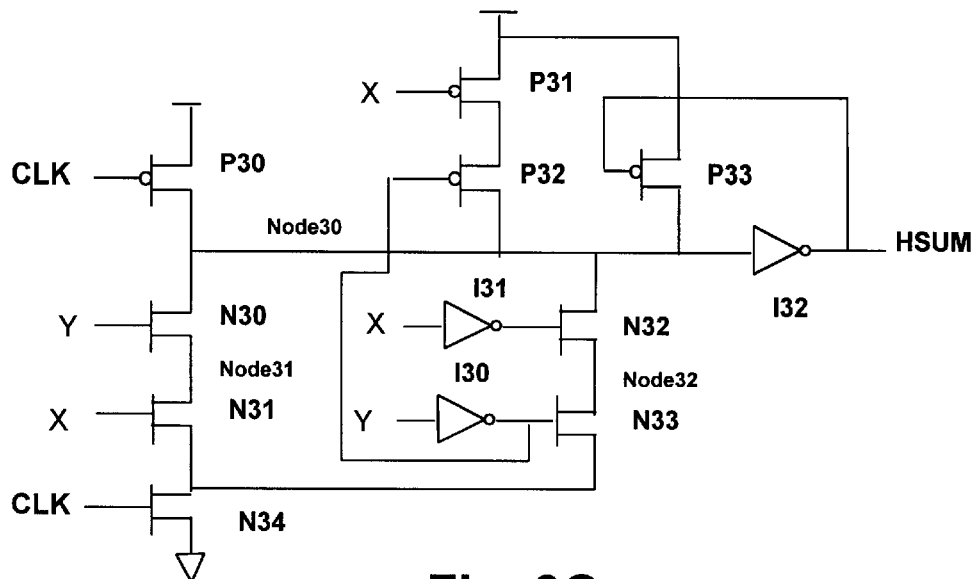

Referring now to FIG. 3B, an alternative embodiment of the improved half-sum added is depicted. In this embodiment, for the high to low transition of input X while input Y is low, the logic input ladder formed by transistors N22 and N23 may exhibit charge-sharing, as transistor N22 begins to conduct. The diffusion capacitance of transistor N23 is then charged by the conduction of transistor N22, if the voltage at Node21 was at a low level prior to the transition. Similarly, the input ladder formed by transistors N20 and N21 exhibits the charge-sharing effect for the high to low transition of input Y while input X is low if Node21 is at a low level. For these logic states, the pull-up ladder formed by transistors P20 and P21 will conduct, preventing the charge-sharing effect from discharging Node20. Referring now to FIG. 3C, a second alternative embodiment of the half-sum circuit is depicted. In this embodiment, a bipolar effect may occur in the input logic ladder formed by transistors N30 and N31 when input X transitions to a logic high state while input Y is at a logic low and a charge-sharing effect can occur when input Y transitions to a logic high while X is in a logic low state. The operation of the pull-up ladder formed by transistors P31 and P32 will hold Node30 high, preventing the charge-sharing effect from dissipating the precharge voltage. In this circuit, the input to transistor P32 is coupled to inverter I30, so that the pull-up ladder will operate when input Y is in a logic high state.

Figure 3D:
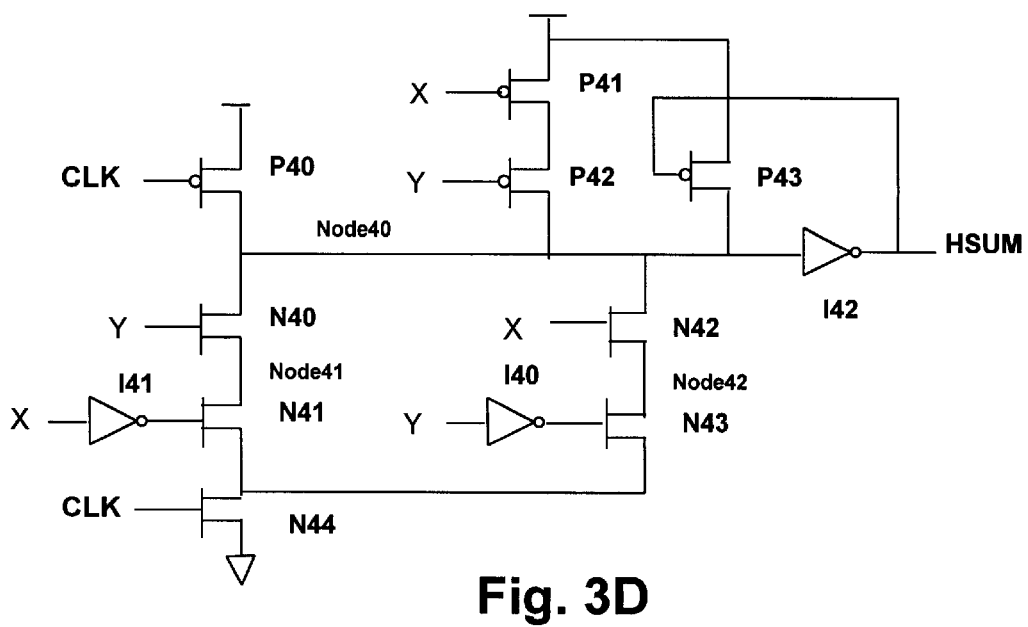

Referring now to FIG. 3D, a half-sum circuit is depicted wherein both input ladders may exhibit a bipolar effect. The input ladder formed by transistors N40 and N41 will exhibit the effect when input Y is at a logic low and input X transitions to a logic low. Similarly, when input X is at a logic low and input Y transitions to a logic low, the bipolar effect may be exhibited by the input logic ladder formed by transistors N42 and N43. As in the prior described circuits, the pull-up ladder formed by transistors P41 and P42 will act to prevent the bipolar effect from dissipating the pre-charge voltage on Node 40.

While the invention has been particularly shown and described with reference to a preferred embodiment, it will be understood by those skilled in the art that various changes in form and detail may be made therein without departing from the spirit and scope of the invention. For example, the N-channel devices forming the logic ladders could be replaced by P-channel devices, while the P-channel devices forming the pull-up ladder are replaced with a pull-down ladder formed from N-channel devices, essentially reversing the voltage level operation of the circuit without changing the essential structure or method steps that characterize the invention.

What is claimed is:

1. A dynamic logic gate, comprising:
    a pre-charge transistor coupled to a summing node for pre-charging said summing node;
    a half-sum circuit coupled to said summing node, wherein said half-sum circuit includes a first logic input ladder comprising a first MOS device and a second MOS device connected in series, a second logic input ladder comprising a third MOS device and a fourth MOS device connected in series, wherein a gate of said first MOS device and is coupled to a first logic input, a gate of said third MOS device is coupled to a second logic input, a gate of said second MOS device is coupled to said second logic input by a first inverter, and a gate of said fourth MOS device is coupled to said first logic input by a second inverter; and
    a pull-up ladder for preventing pre-charge loss due to one or more of charge-sharing and bipolar effect, wherein said pull-up ladder comprises a plurality of transistors, wherein at least one of said plurality of transistors has a channel connection coupled to said summing node, at least one of said plurality of transistors has a channel connection coupled to a power plane, and wherein a gate of each of said plurality of transistors is coupled to a unique one of said first and second logic inputs.

2. The dynamic logic gate according to claim 1, wherein a channel connection of said second MOS device is coupled to said summing node and a channel connection of said third MOS device is coupled to said summing node.

3. The dynamic logic gate according to claim 1, wherein said MOS transistors are implemented in Silicon-On-Insulator technology.

4. The dynamic logic gate according to claim 1, wherein said pull-up ladder comprises a plurality of MOS transistors having channel connections coupled in series.

5. The dynamic logic gate according to claim 1, wherein a channel connection of said second MOS device is coupled to said summing node and a channel connection of said fourth MOS device is coupled to said summing node.

6. The dynamic logic gate according to claim 1, wherein said pull-up ladder comprises a first P-channel device having a first channel connection coupled to said summing node, a second P-channel device having a first channel connection coupled to a second channel connection of said first P-channel device, wherein a gate of said first P-channel device is coupled to said first logic input, and a gate of said second P-channel device is coupled to said second logic input.

7. The dynamic logic gate according to claim 1, wherein a channel connection of said first MOS device is coupled to said summing node and a channel connection of said fourth MOS device is coupled to said summing node.

8. A dynamic logic gate, comprising:
    a pre-charge transistor coupled to a summing node for pre-charging said summing node;
    a half-sum circuit coupled to said summing node, wherein said half-sum circuit includes a first logic input ladder comprising a first MOS device and a second MOS device connected in series, a second logic input ladder comprising a third MOS device and a fourth MOS device connected in series, wherein a gate of said first MOS device is coupled to a first logic input, a gate of said second MOS device is coupled to a second logic input, a gate of said third MOS device is coupled to said first logic input by a first inverter, a gate of said fourth MOS device is coupled to said second logic input by a second inverter, a channel connection of said first MOS device is coupled to said summing node, and a channel connection of said third MOS device is coupled to said summing node; and
    a pull-up ladder for preventing pre-charge loss due to one or more of charge-sharing and bipolar effect, wherein said pull-up ladder comprises a plurality of transistors, wherein at least one of said plurality of transistors has a channel connection coupled to said summing node, at least one of said plurality of transistors has a channel connection coupled to a power plane, and wherein a gate of each of said plurality of transistors is coupled to a unique one of said first and second logic inputs.

9. A method for preventing pre-charge loss in a dynamic logic circuit due to chargesharing or bipolar effects, wherein said dynamic logic circuit has a plurality of logic inputs and wherein said method comprises the steps of:
    pre-charging a summing node of said dynamic logic circuit, wherein said dynamic logic includes at least one logic input ladder having a first transistor connected in series with a second transistor, said first transistor has a channel terminal connected to said summing node;
    determining whether or not said plurality of logic inputs are in a state at which an entry to that state can cause a loss of pre-charge from said summing node;
    in response to determining that said plurality of logic inputs are in a state at which an entry to that state can cause a loss of pre-charge from said summing node, supplying a current through a pull-up ladder having a plurality of transistors, wherein at least one of said plurality of transistors is coupled to said summing node; and
    wherein a gate of said first transistor is coupled to a gate of one of said plurality of transistors comprising said pull-up ladder, a gate of said second transistor is coupled to a gate of another of said plurality of transistors, said determining step is performed in conformity with a determination that said gate of said second transistor is in a state such that said second transistor will conduct and said gate of said first transistor is in a state such that said first transistor will not conduct.

10. The method according to claim 9, wherein said dynamic logic gate further comprises at least one logic input ladder having at least one logic input, and said method further comprises the step of discharging said summing node through said at least one logic input ladder in conformity with a state of said at least one logic input.

11. The method according to claim 10, wherein said determining step determines whether or not said first transistor and said second transistor are in a state wherein a bipolar effect may occur.

12. The method according to claim 10, wherein said at least one logic input ladder comprises a first transistor connected in series with a second transistor, said first transistor has a channel terminal connected to said summing node, and wherein said determining step determines whether or not said first transistor and said second transistor are in a state wherein charge-sharing may occur.

13. The method according to claim 11, wherein said first transistor and said second transistor are implemented in SOI technology, and said supplying step is performed to prevent mis-operation of said dynamic logic gate due to a bipolar effect occurring in said first transistor.

14. The method according to claim 9, wherein said determining step is performed by a switching action of said plurality of transistors.

15. The method according to claim 9, wherein said plurality of transistors have channels connected in series and said determining step is performed in conformity with all of said gates of said plurality of transistors being in a state that causes all of said plurality of transistors to conduct.

16. The method according to claim 9, wherein said plurality of transistors are MOS transistors, and said step of supplying is performed through said MOS transistors.

* * * * *